United States Patent
Ikeda (10) Patent No.: US 9,976,892 B2
(45) Date of Patent: May 22, 2018

(54) VOLUME MEASURING DEVICE AND VOLUME MEASURING METHOD

(71) Applicant: IMAGINEERING, INC., Kobe (JP)

(72) Inventor: Yuji Ikeda, Kobe (JP)

(73) Assignee: IMAGINEERING, INC., Kobe (JP)

( * ) Notice: Subject to any disclaimer, the term of this patent is extended or adjusted under 35 U.S.C. 154(b) by 273 days.

(21) Appl. No.: 14/689,924

(22) Filed: Apr. 17, 2015

(65) Prior Publication Data

US 2015/0226593 A1 Aug. 13, 2015

Related U.S. Application Data

(63) Continuation-in-part of application No. PCT/JP2013/078230, filed on Oct. 17, 2013.

(30) Foreign Application Priority Data

Oct. 19, 2012 (JP) .................... 2012-232268

(51) Int. Cl.
| | |
|---|---|
| *G01F 17/00* | (2006.01) |
| *G01M 15/05* | (2006.01) |
| *F02F 1/18* | (2006.01) |
| *F02F 11/00* | (2006.01) |

(52) U.S. Cl.
CPC .............. *G01F 17/00* (2013.01); *F02F 1/18* (2013.01); *F02F 11/00* (2013.01); *G01M 15/05* (2013.01)

(58) Field of Classification Search
CPC ...................................................... G01F 17/00
See application file for complete search history.

(56) References Cited

U.S. PATENT DOCUMENTS

| | | | | |
|---|---|---|---|---|
| 5,195,482 A | * | 3/1993 | Smith .................... | F02M 53/04 123/198 A |
| 5,786,531 A | * | 7/1998 | Lewis .................... | G01M 15/08 73/114.16 |
| 2009/0293821 A1 | * | 12/2009 | Nakamizo ................ | F01P 5/06 123/41.65 |

(Continued)

FOREIGN PATENT DOCUMENTS

| | | | |
|---|---|---|---|
| DE | 3320793 A1 | * 12/1984 | ............ F02B 77/087 |
| JP | 6-82342 A | 3/1994 | |

(Continued)

OTHER PUBLICATIONS

Milorad Mirjanic, Translation of DE3320793 used in 1st Office Action, dated 1984, Espacenet.*

(Continued)

*Primary Examiner* — Manish S Shah
*Assistant Examiner* — Timothy Graves
(74) *Attorney, Agent, or Firm* — Bacon & Thomas, PLLC (57) ABSTRACT

The volume measuring device has a coating forming means which, using resin, forms a coating on either part or all of the inner surface of the cylinder; a pressure measuring means which introduces a fixed quantity of gas into the cylinder in which the coating has been formed, or derives a fixed quantity of gas from the inside of the cylinder, and measures the pressure within the cylinder before and after the introduction/derivation; and a volume calculating means which uses the pressure value obtained by the pressure measuring means to calculate the volume of the cylinder.

5 Claims, 6 Drawing Sheets

(56) References Cited

U.S. PATENT DOCUMENTS

2011/0210183 A1* 9/2011 Hanson ............... F02D 9/1035
239/8

FOREIGN PATENT DOCUMENTS

JP        7-332108 A     12/1995
JP     2010-185290 A     8/2010

OTHER PUBLICATIONS

Chemteam, Combined Gas Law, Jan. 2012.*
International Search Report dated Mar. 4, 2014 issued in corresponding application No. PCT/JP2013/078230.
Microfilm of the specification and drawings annexed to the request of Japanese Utility Model Application No. 24291/1987 (Laid-Open No. 132318/1988), p. 5, line 12 to p. 8, line 3; Figs. 1-2 by Mitsubishi Motor Corps. and Nippon Jidosha Engineering Kabushiki Kaisha.

* cited by examiner

VOLUME MEASURING DEVICE AND VOLUME MEASURING METHOD

TECHNICAL FIELD

The present invention relates to a volume measuring device and volume measuring method.

BACKGROUND

There are several known methods for measuring a cylinder volume of the combustion chamber of a reciprocation engine when a piston is at top dead center. The first method is to utilize the volume and pressure change of the medium inside the combustion chamber (JP H04-198833A, JP H06-082342A). The second method is an acoustic volume measuring method using a Helmholtz resonator (JP H06-186070A). The third method is to measure the quantity of the oil needed to fill the hollowed portion of the cylinder main body that is surrounded by the piston positioned at the top dead center and cylinder head. However, the first and second methods may have disadvantages that the pressure variation and the acoustic pressure cannot be measured accurately because the air leak may occur at a gap around the piston ring and the combustion chamber may not be a completely closed object. The third method has a disadvantage for use in a factory line because it is necessary to disassemble the cylinder main body.

SUMMARY

The present invention relates to a volume measuring device of a cylinder in a reciprocation engine including:

a coating forming means which forms a coating using resin on a portion of or entire inner surface of the cylinder;

a pressure measuring means which introduces a fixed quantity of gas into the cylinder where the coating is formed therein or derives a fixed quantity of gas from inside the cylinder and measures the pressure inside the cylinder before and after the introduction or derivation of the gas; and a volume calculation means that calculates the cylinder volume using a pressure value obtained by the pressure measurement means.

The coating is formed on the inner surface of the cylinder for blocking the gap around the piston ring and the gas leak does not occur during the pressure measurement. This allows an accurate measurement of the pressure. Further, the cylinder volume can be calculated accurately and conveniently by using a pressure variation that occurs when a fixed quantity of gas is introduced inside the cylinder or when a fixed quantity of a gas is emitted from inside the cylinder. This allows an application for inspection of the product in the production line of a factory.

The volume measuring device can have a cleansing means that cleanse inside the cylinder by high temperature/pressure gas prior to the coating executed by coat forming means.

This allows an accurate measurement of the cylinder volume because the coating is formed after the removal of the oil or dust attached inside the cylinder.

The volume measuring device can have elimination means that thermal decomposes the coating, after the pressure measurement executed by the pressure measurement means, by introducing a high temperature gas inside the cylinder and that eliminates the organic gas arose from the thermal decomposition.

Since the coating is formed by the resin, the coating can be eliminated conveniently by thermal decomposition after the pressure measurement using heating process and by eliminating the organic gas, and can retrieve an original state.

The coating formation means can have a spraying device which sprays the resin to a portion of or entire inner surface of the cylinder; and a cooling device which cools the sprayed resin.

A thin and uniform thickness coating can be formed easily by spraying the resin to the cylinder surface. Further, the coating can be formed efficiently in a reduced time by equipping the cooling device.

The volume measuring device can be used suitably for measurement of a cylinder volume when the piston is at the top dead center. Although the volume measuring device can measure the volume regardless of the position of the piston, this device allows an accurate and convenient measurement compared with the conventional method. Thus, the volume can be measured accurately even at the top dead center position where the volume is small and measurement error tends to occur.

The present invention relates to volume measuring method of a cylinder in a reciprocation engine including:

a coating forming step which forms a coating on a portion of or entire inner surface of the cylinder using resin;

a pressure measuring step which introduces a fixed quantity of gas into the cylinder where the coating is formed therein or derives a fixed quantity of gas from inside the cylinder and measures the pressure inside the cylinder before and after the introduction or derivation of the gas; and a volume calculation step that calculates the cylinder volume using a pressure value obtained at the pressure measurement step.

The volume measuring method allows an accurate and convenient inspection of the cylinder volume in a factory line of the reciprocating engine.

DETAILED DESCRIPTION

In the following, a detailed description will be given of an embodiment of the present invention with reference to the accompanying drawings. It should be noted that the following embodiments are merely preferable examples, and do not limit the scope of the present invention, applied field thereof, or application thereof.

First Embodiment

Figure 1:
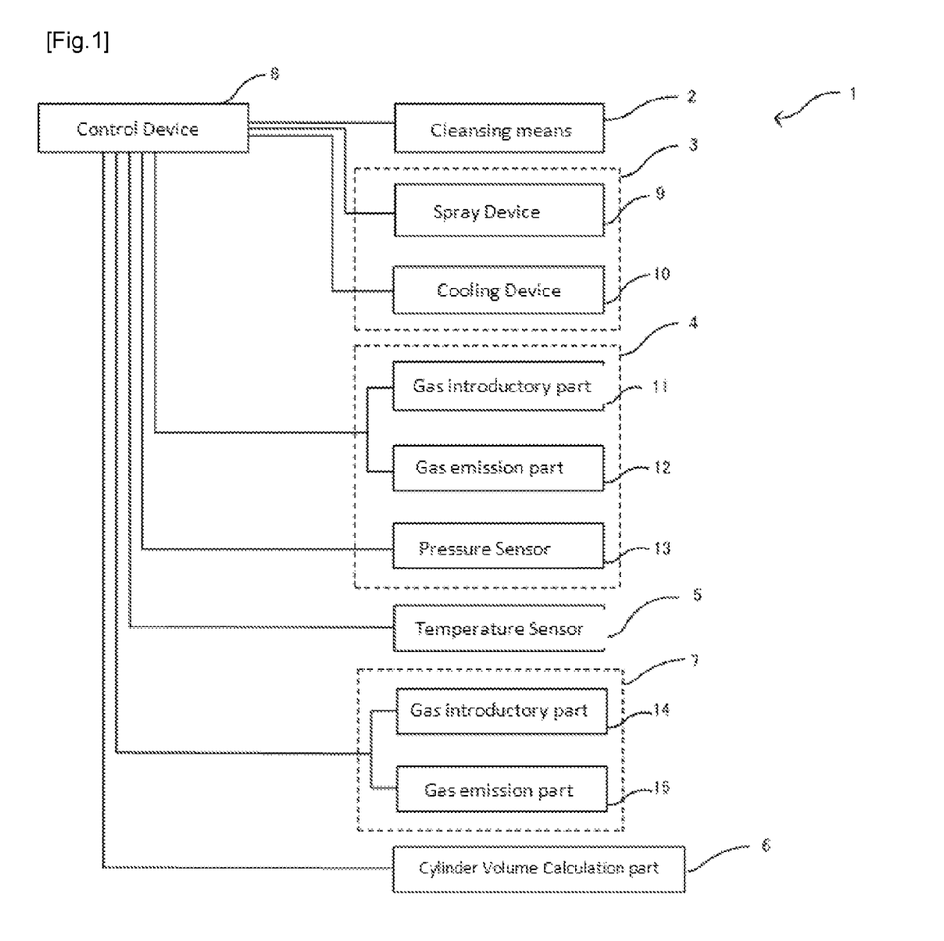
FIG. 1 is a block diagram of a volume measuring device according to a first embodiment of the volume measuring device.

The present embodiment relates to volume measuring device 1 for measuring cylinder volume in an internal-combustion engine of a reciprocation engine. Volume measuring device 1 has cleansing means 2, coating formation means 3, pressure measurement means 4, temperature sensor 5, cylinder-volume calculation means 6, elimination means 7, and control means 8. Coating formation means 3 has spraying device 9 and cooling device 10. Pressure measurement means 4 has gas introductory part 11, gas emission part 12, and pressure sensor 13.

Volume measuring device 1 cleanses inside the cylinder using cleansing means 2 and then coats a portion of or entire inner surface of a cylinder with resin using spraying device 9 of coating formation means 3. The coated resin is cooled by cooling device 10, and the coating is thereby formed. A fixed quantity of gas is then introduced inside the cylinder, where the coating is formed therein, from gas introductory part 11. Or otherwise, a fixed quantity of gas is emitted from gas emission part 12. Then pressure sensor 13 measures the pressure inside the cylinder before and after the introduction or emission of the gas. Cylinder-volume calculation means 6 calculates the volume of the cylinder from using pressure or temperature information of cylinder before and after the introduction or derivation of the gas.

Internal-combustion engine 20, in which volume measuring device 1 of present embodiment is employed, is a reciprocating type internal-combustion engine having piston 22 that reciprocates. This piston 22 has a multiple piston rings 23. In this internal-combustion engine 20, air-fuel mixture is ignited by ignition device and the air-fuel mixture is thereby combusted (so called "combustion cycle"). The compression ratio is determined by the ratio of the cylinder volume when piston 22 is at top dead center and when at bottom dead center. Volume measuring device 1 of this embodiment is a device for measuring the volume of cylinder 21 irrespective of the position of piston 22, and can measure the cylinder volume when the piston is at top dead center and bottom dead center.

Cleansing Means

Figure 2:
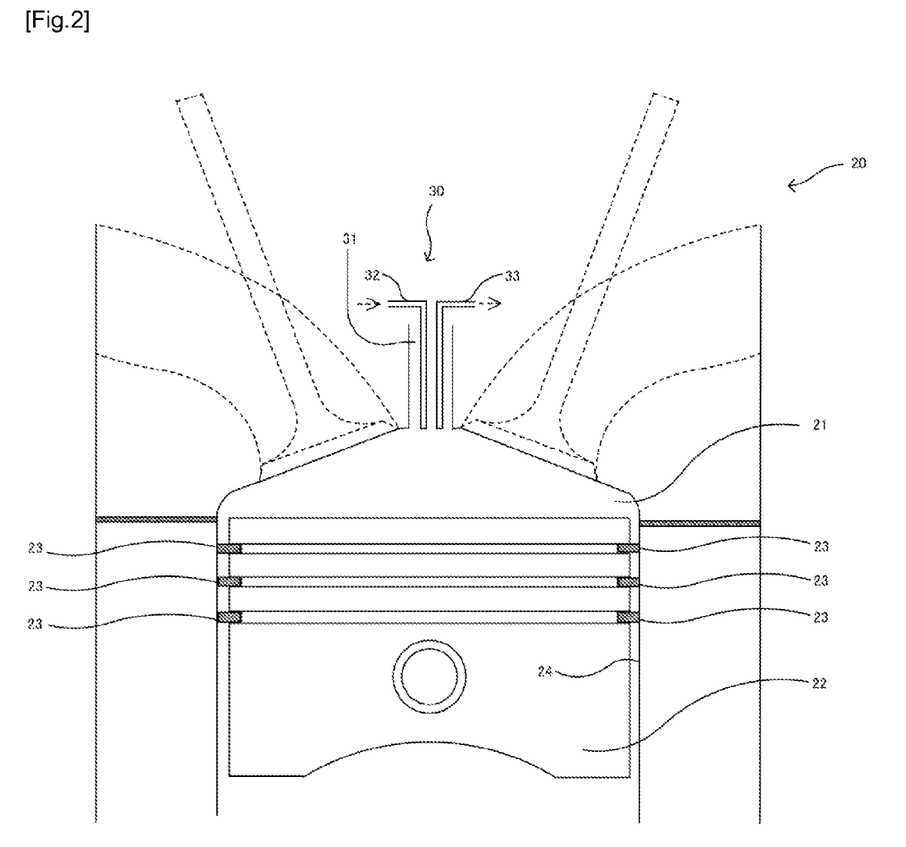
FIG. 2 is a vertical sectional view of a cleansing means according to a first embodiment of the volume measuring device.

As shown in FIG. 2, cleansing means 30 of this embodiment is attached to plughole 31 for the igniter mentioned above. Cleansing means 30 has gas introductory part 32 which introduces high temperature and high pressure gas inside cylinder 21, and gas emission part 33 which eliminates the of the cleansed gas by aspiration.

Coating Formation Means

Figure 3:
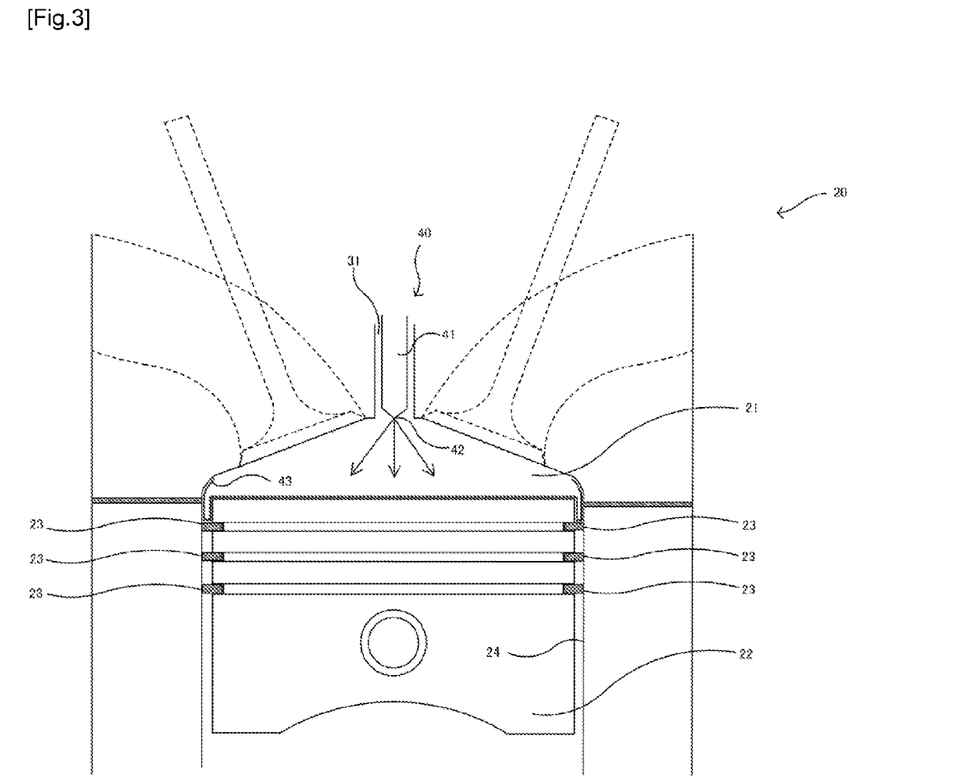
FIG. 3 is a vertical sectional view of a coat forming means according to a first embodiment of the volume measuring device.

As shown in FIG. 3, coating formation means 40 has spraying device 41. Spraying device 41 is attached to plughole 31 for the igniter such that injection nozzle 42, which injects resin, is located in the upper part of the cylinder. The injection nozzle has a nozzle that can spray resin to an arbitrary area of the inner surface of the cylinder (not illustrated).

Pressure Measurement Means

Figure 4:
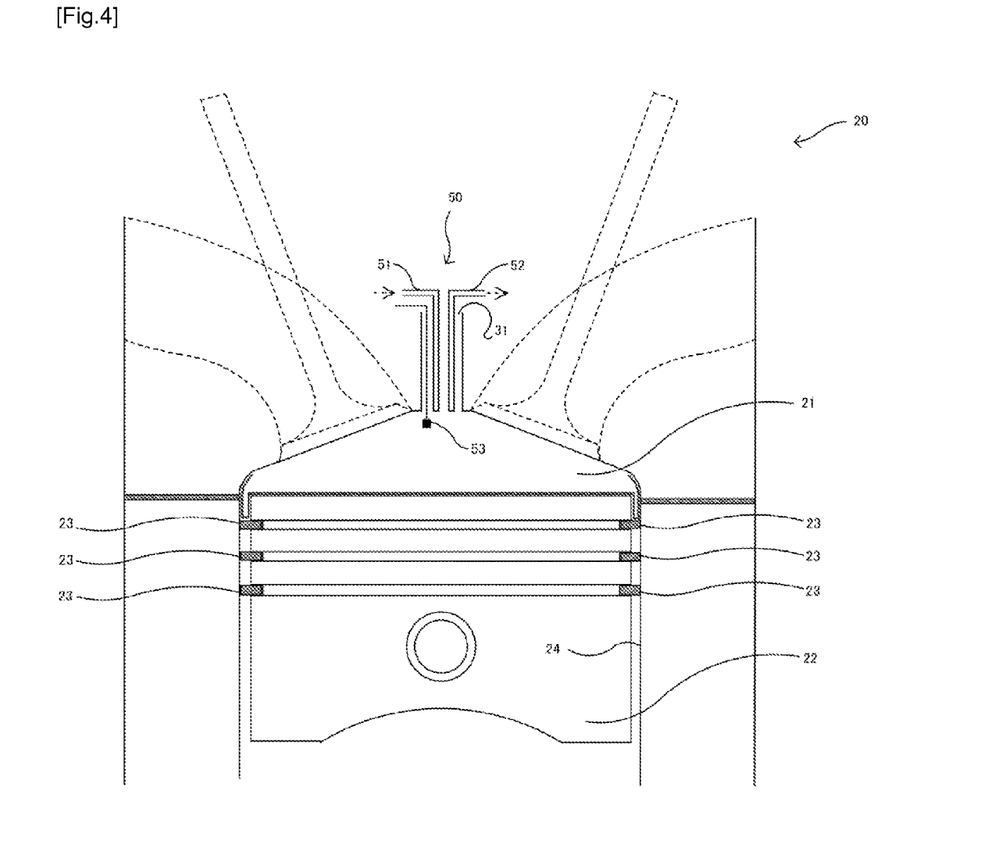
FIG. 4 is a vertical sectional view of a pressure measuring means according to a first embodiment of the volume measuring device.

As shown in FIG. 4, pressure measurement means 50 consists of gas introductory part 51, gas emission part 52, and pressure sensor 53. Pressure measurement means 50 is attached to plughole 31 for the igniter. The volume of the gas introduced from gas introductory part 51 and the emitted gas are controlled accurately by control device 8. Pressure sensor 53 is attached through the plughole 31 such that the pressure of cylinder 21 can be measured. In the present invention, pressure sensor 53 is required to have a capability that can measure a subtle variation of the pressure with a sufficient accuracy.

Cylinder-Volume Calculation Means

Cylinder-volume calculation means 6 calculates the cylinder volume using pressure information obtained by pressure measurement means 4, temperature information detected by temperature sensor 5, and gas volume information introduced from gas introductory part 51.

Elimination Means

Figure 5:
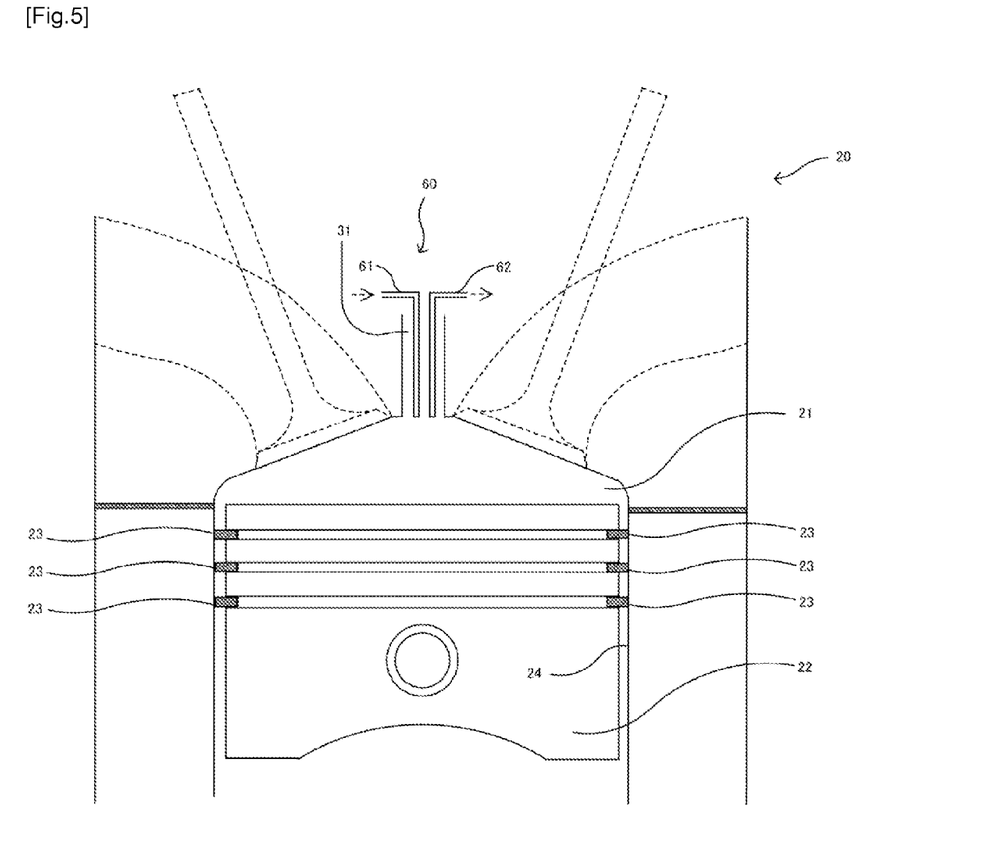
FIG. 5 is a vertical sectional view of elimination means according to a first embodiment of the volume measuring device.

As shown in FIG. 5, elimination means 60 has introductory part 61 and emission part 62 that introduces and emits high temperature gas respectively. Elimination means 60 is attached to plughole 31 for the igniter. Introductory part 61 decomposes the coating formed by resin by introducing high temperature gas inside the cylinder, and emits the generated organic gas.

Next, the operation of this embodiment is discussed.

Piston 22 is located at a target position for measuring a cylinder volume in a combustion chamber of a reciprocation engine. The target position is, for example, top dead center and bottom dead center. Cleansing means 30 of the volume measuring device of this embodiment is attached to plughole 31. Cleansing means 30 has gas introductory part 32 and gas emission part 33. Gas introductory part 32 is attached near the ceiling of cylinder 21 so that high temperature and high pressure gas can cleanse inside cylinder 21. High temperature and high pressure gas introduced from gas introductory part 32 decomposes, volatilizes or tears adhesion such as oil that remains in cylinder 21. The decomposed, volatilized or tore adhesion are emitted from gas emission part 33 by aspiration, and the cleansing in cylinder 21 is thereby completed. Further, the introduction timing and amount (time), and the emission timing and amount (time) of high temperature and high pressure gas is controlled by control means 8.

Then, spraying device 41 is attached to plughole 31. Spraying device 41 sprays resin in cylinder 21 cleansed by cleansing means 30, and coats a portion of or entire surface of cylinder 21. The resin can block the gap portion near piston ring 23 where the gas tends to leak, specifically the gap between piston ring 23 and combustion chamber inner wall 24. Spraying device 41 has injection nozzle 42 at its tip portion of cylinder 21 sides. Spraying device 41 has multiple spraying holes to spray resin to any area in cylinder 21.

The coated resin is cooled by cooling device 10 (not illustrated) and forms coating 43 so that the gas leak during the pressure measurement is prevented. When the coating consisting of the resin has sufficient strength, use of cooling device 10 is not necessary.

The thickness of the coating should be an amount that does not affect the volume of the cylinder 21. Generally, the thickness shall be 10 μm or more and 200 μm or less. 10 μm or more and 100 μm or less is preferable. 10 μm or more and 50 μm or less is much preferable. 10 μm or more and 25 μm or less is optimum. The cylinder volume may be estimated by first spraying a predetermined amount of resin by spraying device 41, and then adding the predetermined amount of resin to the computed cylinder volume. In this case, the coating can have any thickness but shall be small enough so that it can be eliminated easily using an elimination procedure mentioned later.

The resin can be a polycyclic aromatic hydrocarbon (PAH) such as naphthalene, paraffinic hydro-carbon or polymer. The polymer can be polystyrene, polyvinyl pyridine, aromatic polyether sulphone such as halogenated aromatic polyether sulphone, polyacrylonitrile, polyalkylene oxide, polyethylene, polylactic acid, poly-siloxane, polycaprolactone, polycaprolactam, polyurethane, polymethacrylate, polymethacrylic acid, polyacrylate, polyacrylic acid, polydiene, polyvinyl chloride and polyacetal.

Thereafter, pressure measurement means 50 is attached to plughole 31 as shown in FIG. 4. Pressure measurement means 50 has gas introductory part 51, gas emission part 52, and pressure sensor 53. Gas introductory part 51 introduces the gas for measurement into cylinder 21 from a tank that supplies the gas. Type and quantity of the introduced gas is controlled accurately by control means 8. In this embodiment, introduction of the measurement gas from introductory part 51 is paused at an arbitrary timing T1 where the gas inside cylinder 21 is replaced completely to the measurement gas. Pressure sensor 53 measures the pressure inside the cylinder at time T1. This measured value information is transmitted to cylinder volume calculation means 6 which is discussed later. The measurement gas of predetermined quantity is then introduced inside the cylinder from gas introductory part 51. Pressure sensor 53 measures the pressure inside cylinder 21 at time T2 where introduction of the measurement gas of predetermined amount is completed. This measured value information is transmitted similarly as above to cylinder volume calculation means 6.

Temperature sensor 53 transmits the temperature information inside cylinder 21 of times T1 and T2 to cylinder volume calculation means 6.

Elimination means 60 is then operated to eliminate the coating, which is made of resin, formed on the inner surface of cylinder 21, and replaces the measurement gas inside cylinder 21 to an open air. Elimination means 60 has gas introductory part 61 and gas emission part 62. The high temperature gas is introduced from gas introductory part 61 and is injected to the coating on the inner surface of cylinder 21. The use of high temperature allows thermal decomposition of the coating ingredient made of resin, and an organic gas is generated. Then the generated organic gas and the measurement gas used for measurement are emitted from gas emission part 62 and are eliminated. At this point, open air is introduced from gas introductory part 61 and inside of cylinder 21 is replaced to the open air to retrieve the original state before the measurement operation.

Cylinder-volume calculation means 6 calculates the volume of cylinder 21 according to Boyle Charles's law using pressure and temperature information of cylinder 21 which is received at times T1 and T2, and quantity information of the measurement gas introduced to cylinder 21 from gas introductory part 51 at time T2. When the volume of the coated portion shall be considered, the volume of the cylinder 21 is assumed as a sum of the computed volume and the volume of the coated portion. When the pressure was measured including the peripheral space such as a gas introduction/emission line or plughole 31, the volume of the peripheral space subtracted from the computed volume is assumed as the volume of cylinder 21.

Advantage of the First Embodiment

According to this embodiment, the portion where the gas tends to leak can be sealed by forming the coating made of resin on the inner surface of cylinder 21 using coating formation means 40. For example, the gap between piston ring 23 and combustion chamber inner wall 24 and end gap of the piston ring can be sealed. This allows an accurate measurement of pressure inside cylinder 21. The volume measurement device according to this embodiment replaces inside cylinder 21 into a measurement gas and then measures pressure and temperature inside cylinder 21 of this time point. Then the pressure and temperature inside cylinder 21 is measured after the predetermined amount of measurement gas is introduced therein. Volume of cylinder 21 is computed by calculating such information. The volume of cylinder 21 can thereby be measured precisely and conveniently. This allows the use in quality verification in the mass-production line of engines.

Second Embodiment

The following embodiment can be contemplated. The portion which is common to the first embodiment will not be described in detail.

Figure 6:
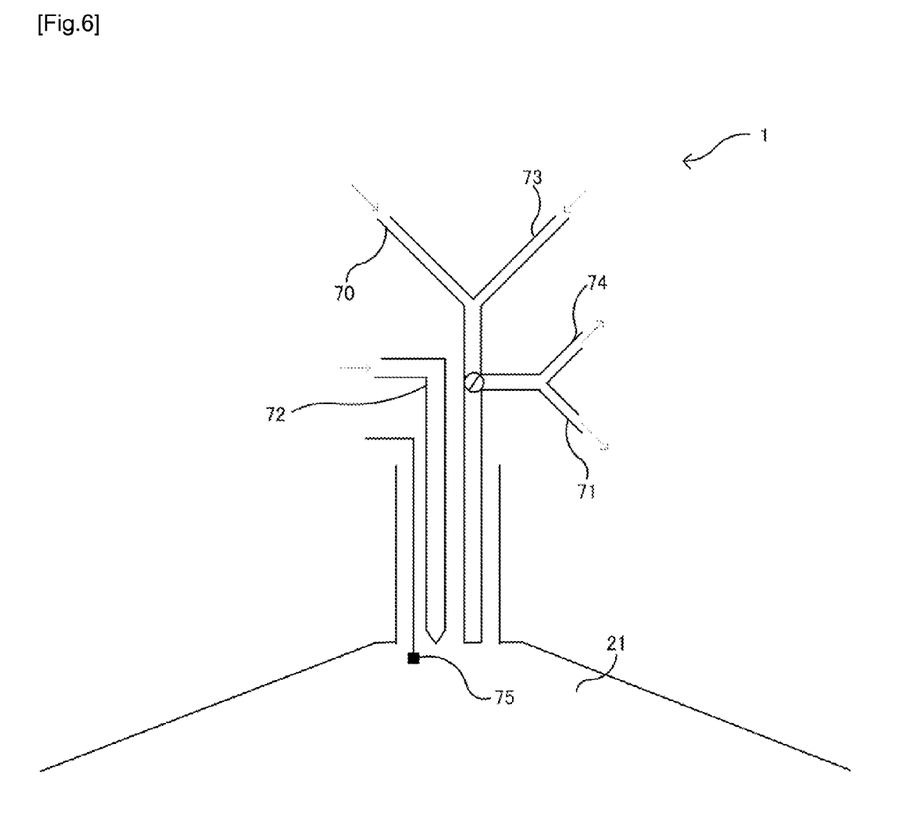
FIG. 6 is a vertical sectional view of elimination means according to a second embodiment of the volume measuring device.

In volume measuring device 1 of the first embodiment, cleansing means 2, coating formation means 3 and pressure measurement means 4 are replaced for respective process. Instead, a device which equips all of these means can be attached as shown in FIG. 6 can be used. This eliminates the need of replacement but can achieve the same function. Volume measuring device 1 of the present invention allows an efficient measurement of cylinder volume by such configuration.

In this embodiment, gas introduction/emission of cleansing means 2, pressure measurement means 4, and elimination means 7 are made by single device as shown in FIG. 6. As cleansing means 2, high temperature and high pressure gas are introduced in the cylinder 21 from gas introductory part 70. Here, gas emission part 71 may be opened and adjusted so that the cleansing can be done easily. The lines besides gas introductory part 70 and gas emission part 71 are closed by cock. Gas introductory part 70 is controlled by control means 8 in the cleansing process so that the high temperature and high pressure gas for cleansing is supplied because this part is used for supplying both the gas for cleansing, and the gas for decomposition. The gas used for cleansing is emitted from gas emission part 71 after the adhesive inside cylinder 21 is decomposed, volatilized and tore by the introduction of high temperature and high pressure gas.

Resin is then sprayed inside cylinder 21 from spraying device 72, and the coating made of resin is formed in a portion of or entire inner surface of cylinder 21. Cooling device 10 may operated thereafter to cool the coating to reinforce the strength of the coating.

The measurement gas is then introduced inside the cylinder from the measurement gas introductory part 73 of pressure measurement means 4. At this time, the line of measurement gas emission part 74 is also opened to replace the entire gas inside the cylinder to the measurement gas. All the lines are then closed and pressure sensor 75 measures the pressure inside cylinder 21 at this time point (T1). The measured value information is transmitted to cylinder volume calculation means 6 described later. Next, measurement gas introductory part 73 is opened again and the measurement gas of predetermined quantity is introduced inside cylinder 21. Pressure sensor 75 measures the pressure inside cylinder 21 at time T2 where the introduction of the measurement gas is completed. The measured value information is transmitted to cylinder volume calculation means 6 similarly as above. The computation of the volume of cylinder 21 is executed by similar method as the first embodiment.

High temperature gas is then introduced from gas introductory part 70 and is sprayed to the coating of the inner surface of cylinder 21. At this time, the line of gas emission part 71 is opened simultaneously and the pressure inside cylinder 21 is adjusted. Next, the generated organic gas and the measurement gas used for the measurement are emitted by aspiration and are eliminated from gas emission part 71. At this time, the open air is introduced from gas introductory part 70, and inside of the cylinder is replaced to the open air to retrieve the original state before the measurement operation.

Other Embodiments

In the above embodiment, the gas inside cylinder 21 does not need to be replaced to the measurement gas when the gas components of the measurement gas introduced during the pressure measurement of cylinder 21 and the gas inside cylinder 21 after formation of the coating are the same. In this case, lines other than measurement gas introductory part 73 shall be closed after the resin coating is formed. Then the measurement gas of predetermined quantity and the following procedures can be performed similarly.

In the above embodiment, inside of the cylinder may be decompressed by emitting the measurement gas of predetermined quantity from gas emission part 12 when the pressure is measured after the gas inside cylinder 21 is replaced with the measurement gas at time T1. The volume of cylinder 21 can be calculated by cylinder volume calculation means 6 using pressure and temperature information when the measurement gas of predetermined quantity is emitted at time T2 and pressure and temperature information at time T1.

INDUSTRIAL APPLICABILITY

As discussed above, the cylinder volume can be measured precisely and conveniently when the piston is at top dead center without being influenced by the gap around the piston ring. The volume measuring device and volume measuring method of the present invention can be used conveniently for the quality verification in the factory line of mass production engines.

The invention claimed is:

1. A volume measuring device of a cylinder in a reciprocation engine comprising:
   a coating forming means having a spraying device and configured to form a coating on a portion of or entire inner surface of the cylinder using resin;
   a pressure measuring means provided with a gas introductory part, a gas emission part and a pressure sensor, and configured to introduce a fixed quantity of gas into the cylinder where the coating is formed therein or derive a fixed quantity of gas from inside the cylinder and measures a pressure inside the cylinder at times T1 and T2 before and after the introduction or derivation of the gas;
   a temperature sensor configured to sense the temperature inside the cylinder at times T1 and T2; and
   a volume calculation means configured to calculate a cylinder volume using a pressure and temperature information of the cylinder at times T1 and T2, obtained by the pressure measuring means and the temperature sensor, and information of said fixed quantity of gas.

2. The volume measuring device of claim 1 further comprising a cleansing means to cleanse inside the cylinder by high temperature/pressure gas prior to the coating executed by coating forming means.

3. The volume measuring device of claim 1, further comprising elimination means that thermally decomposes the coating, after a pressure measurement executed by the pressure measurement means, by introducing a high temperature gas inside the cylinder and eliminates an organic gas which arose from the thermal decomposition.

4. The volume measuring device of claim 1, wherein the coating formation means includes:
   a sprayed resin cooling device.

5. The volume measuring device of claim 1, wherein the cylinder is in the top dead centre position.

* * * * *